United States Patent [19]

Becker

[11] Patent Number: 4,502,832
[45] Date of Patent: Mar. 5, 1985

[54] TURBO-MOLECULAR PUMP

[75] Inventor: Willi Becker, Braunfels, Fed. Rep. of Germany

[73] Assignee: Arthur Pfeiffer Vakuumtechnik Wetzlar GmbH, Asslar, Fed. Rep. of Germany

[21] Appl. No.: 465,564

[22] Filed: Feb. 10, 1983

[30] Foreign Application Priority Data

Nov. 2, 1982 [DE] Fed. Rep. of Germany ....... 3204750

[51] Int. Cl.³ ............................................. F04D 29/04
[52] U.S. Cl. ......................................... 415/10; 415/14; 415/107; 415/118; 415/132; 417/354; 417/365; 384/603
[58] Field of Search ....................... 415/10, 14, 90, 104, 415/107, 118, 132; 417/352-354, 365, 423 R; 384/248; 308/228

[56] References Cited

U.S. PATENT DOCUMENTS

| 2,993,448 | 7/1961 | Garey | 415/132 X |
| 3,399,827 | 9/1968 | Schwartzman | 415/90 X |
| 3,749,528 | 7/1973 | Rousseau et al. | 415/90 X |
| 3,759,626 | 9/1973 | Becker | 415/90 |
| 3,828,610 | 8/1974 | Swearingen | 415/104 X |
| 3,861,818 | 1/1975 | Eggenberger | 415/118 X |
| 4,023,920 | 5/1977 | Bachler et al. | 415/90 X |
| 4,036,565 | 7/1977 | Becker | 415/90 X |
| 4,057,369 | 11/1977 | Isenberg et al. | 417/365 |
| 4,116,592 | 9/1978 | Cherny et al. | 415/90 X |
| 4,302,963 | 12/1981 | Collins | 415/118 X |

FOREIGN PATENT DOCUMENTS 693021 6/1953 United Kingdom ................. 415/14

Primary Examiner—Samuel Scott
Assistant Examiner—B. Bowman
Attorney, Agent, or Firm—Toren, McGeady and Stanger

[57] ABSTRACT

A turbo-molecular pump has passive magnetic bearings which are radially stable but axially unstable and mechanical thrust bearings acting axially, the magnetic bearings and the stator forming a structural unit movable axially within the pump housing and connected to an element adjustably supporting one thrust bearing while the other thrust bearing is fixed to the housing with control gear being provided for adjusting the structural unit relative to the housing and the thrust bearing relative to the structural unit in dependence on force sensing devices.

11 Claims, 1 Drawing Figure

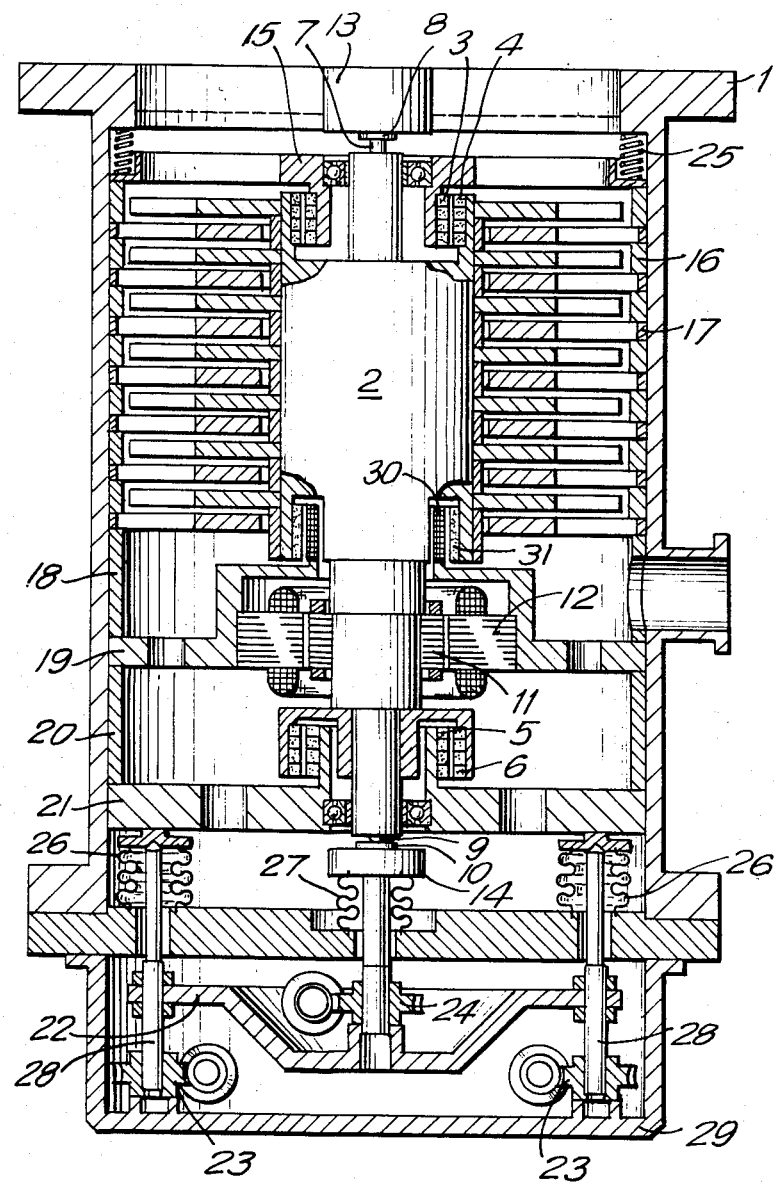

TURBO-MOLECULAR PUMP

BACKGROUND OF THE INVENTION

The invention relates to a magnetic bearing arrangement for the rotors of turbo-molecular vacuum pumps wherein the four radial degrees of freedom of a rotor are stabilized by passive magnetic radial bearings and the axial degree of freedom is supported by dry-running mechanical thrust bearings. This axial bearing arrangement is effected in such a manner that the axial position of the rotor is held in such a position that the bearing force of the rotor always remains below a predetermined value.

Such a bearing arrangement is described in the German specification No. 28 25 551 as laid open. In this case, the radial degrees of freedom are fixed by non-regulated magnetic radial bearings. These radial bearings consist of permanent magnetic subassemblies which are mounted, with radially opposite magnetization, on rotating and non-rotating parts. This type of bearing arrangement, however, causes an unstable position of equilibrium in the axial direction. Therefore, if the rotor moves slightly out of the axially unstable position of equilibrium, forces arise which move it further out of the position of equilibrium. These forces increase with the distance of the rotor from the position of equilibrium so that the rotor presses on the thrust bearing arrangement with a multiple of its weight. The German specification No. 28 25 551 describes how these forces are kept below a predetermined value.

Their magnitude is determined by force measuring devices. If these forces exceed a certain value, then a regulating mechanism is set in motion which holds the rotor in the vicinity of the unstable position of equilibrium so that the axial bearing forces do not exceed a predetermined value. This type of mounting is described in the above specification in three different embodiments, which, however, have important disadvantages in practical applications:

(a) The axial position of the rotor is recorded by an electrical position measurement. Contacts are closed when the rotor is in the unstable position of equilibrium within predetermined limits and they are opened as soon as the rotor moves out of this predetermined axial position, to one side or the other. This arrangement has the disadvantage that, at the very high speeds of rotation usual in turbo-molecular pumps, the making of the contacts is very uncertain and accordingly no clear regulating signals can be obtained. In addition the necessary control gearing at the high-vacuum side is very disruptive because it occupies a great deal of room and so, inter alia, sensibly reduces the input conductance of the pump.

(b) The axial position of the rotor is determined by a force measuring device at both sides of the rotor and is regulated by control gearing likewise at both sides of the rotor. This arrangement has the following disadvantage:

Turbo-molecular pumps are generally heated in order to achieve a high final vacuum. As a result of this heating, the housing expands. Since the non-rotating parts of the mechanical thrust bearing are rigidly connected to the housing, the spacing between bearing surface and rotor journal in the thrust bearing is thus increased. If the rotor is bearing against the upper bearing surface of the mechanical thrust bearing, regulation takes place and the expansion is compensated for. On the other hand, if the rotor is bearing against the lower bearing surface of the mechanical thrust bearing, then the upper bearing surfaces moves away from the rotor as a result of the expansion and regulation cannot respond because the predetermined force is not exceeded in this case. Now if, for example as a result of a shock, the rotor jumps to the other side of the mechanical thrust bearing, it may find itself at a large distance from the unstable position of equilibrium and so far outside the predetermined limits, as a result of which inadmissibly high bearing forces may occur. A further disadvantage, as under (a) is the large space requirements of the control gear at the high vacuum side.

(c) In order to avoid these disadvantage of the control gear at the high vacuum side, a further device is proposed in the above specification with which there is no gear at the high vacuum side. In this case, the journal of the lower mechanical thrust bearing experiences the full wear which may lie within the order of magnitude of a few mm. This can be accepted if the device is appropriately designed. At the upper bearing, however, wear means a deviation from the unstable position of equilibrium. This is very critical as the following example shows: With an axial unstable rigidity of 300 n/mm and a predetermined bearing force of 1N, the deflection of the rotor out of the unstable position of equilibrium should not be greater than 1/300 mm. This means that with greater deflection, the life of the rotor journal is very limited.

SUMMARY OF THE INVENTION

It is an object of the invention to provide a magnetically mounted turbo-molecular pump in which some or all of the above described disadvantages are obviated or substantially reduced.

According to the invention, there is provided a turbo-molecular pump comprising a housing, a structural unit mounted in said housing for adjustment relative thereto, a rotor, radially stable but axially unstable passive magnetic bearings for mounting said rotor, holding means for said magnetic forming part of said structural unit, a first mechanical thrust bearing for said rotor mounted on said housing, a second mechanical thrust bearing for said rotor mounted adjustably with respect to said structural unit, force measuring devices for measuring the force applied to said mechanical thrust bearings and control gear responsive to said force measuring devices for adjusting said structural unit relative to said housing and said second mechanical thrust bearing relative to said structural unit.

BRIEF DESCRIPTION OF THE DRAWING

The invention will now be described in greater detail with reference to the drawing, the single FIGURE of which is a sectional view showing a magnetically mounted turbo-molecular pump in accordance with the invention.

DESCRIPTION OF THE PREFERRED EMBODIMENT

In the drawing, the assembly of the invention is shown as comprising a housing 1 of a turbo-molecular pump within which a rotor 2 is mounted. A non-rotating part 3 of an upper permanent magnetic radial bearing is secured in upper magnetic bearing holding means 15. Opposite this is a rotating part 4 of the magnetic bearing. Correspondingly, the unit also includes lower magnetic bearing holding means 21, a non-rotating part 5 of the magnetic bearing a the rotating part 6 of the lower permanent magnetic radial bearing. The mechanical thrust bearings comprise rotating journals 7 and 9 and bearing surfaces 8 and 10. The drive is effected by an electric motor with a rotor 11 and stator 12. The stator 12 of the motor is secured in holding means 19. The bearing forces of the rotor on the non-rotating parts 8 and 10 of the mechanical thrust bearing are detected by force measuring devices 13 and 14. 16 and 17 designate rings which bridge or enclose the stator discs. The upper magnetic bearing holding means 15, the pump stator which is formed by the rings 16 and 17 at the outer circumference, a ring 18, the holding means 19 for the motor stator a ring 20, and the lower magnetic bearing holding means 21 form a structural unit which is displaceable in the housing 1. This structural unit is held together by the springs 25. The initial tension of these springs must be a multiple of the maximum possible force which is produced by the axial instability of the magnetic bearing because otherwise the structural unit would be forced apart by the magnetic forces. The displacement of the structural unit is effected through gears 23 via pins 28, a bottom 29 serving as a support.

Secured to the pins 28 between the gears 23 and the lower magnetic bearing holding means 21 is a platform 22 which carries a gear 24 which can adjust the force measuring device 14 with the bearing surface 10 of the lower mechanical thrust bearing in relation to the structural unit. In order to prevent oil vapours from the gear compartments from getting into the vacuum space, these are separated from the vacuum space by bellows 26 and 27.

A device which consists of a moving coil 30 and a permanent magnet 31 with a radial magnetic field, exerts brief axial force impulses on the rotor at predetermined intervals. These force impulses may likewise be produced by electromagnets, which are switched on briefly alternately.

The gear 23 is controlled by the force measuring device 13 and the gear 24 is controlled by the force measuring device 14. If the force at the force measuring device 13 is too great, for example, then the gears 23 displace the structural unit and the parts connected to the lower platform towards the upper bearing. This corresponds to a relative movement of the rotor downwards in relation to the other components, which leads to a reduction in the axial force. This action persists unitl there is a drop below the predetermined force.

If the force at the lower pick-off or force measuring device 14 is too great, then the bearing surface 10 is moved in the forwards direction by the gear 24 so that the rotor is displaced upwards and the force is reduced. If both force measuring devices show too great a force, then the two gears run in opposite direction so that the bearing surfaces of the mechancial thrust bearings are driven apart and so relieved.

If an air gap appears in a mechanical thrust bearing, between rotor journal and bearing surface, for example as a result of thermal expansion of the housing, this state is not detected by the control in the first instance. A pulse generator transmits positive and negative current pulses to the moving coil 30 alternately at predetermined intervals of time. These are converted into force impulses acting on the rotor in the axial direction, by the electromagnetic device. If the rotor has no contact with one of the bearing surfaces then, as a result of the corresponding impulse, it jumps to that bearing surface and the regulation may then become effective.

It will be understood that the above description of the present invention is susceptible to various modifications, changes and adaptations.

What is claimed is:

1. A magnetically supported turbomolecular pump assembly, comprising:
    a housing;
    a rotor and a stator arranged in cooperative relationship with each other in said housing;
    magnetic radial bearing means consisting of magnetic radial bearings which are stable in the radial direction and unstable in the axial direction interposed between said rotor and said stator for mounting said rotor;
    holding means for mounting said magnetic radial bearing means on said stator, said holding means and said stator being structured as parts of a single structured unit which is mounted to be movable in the axial direction within said housing;
    mechanical axial bearing means including a first axial bearing which is arranged firmly in said housing and a second axial bearing, said mechanical axial bearing means operating to absorb axial stresses generated by said rotor;
    force measuring means for measuring the stresses developed by said rotor in said mechanical axial bearing means; and
    control gear means responsive to said force measuring means for effecting adjustable vertical movement of said structural unit relative to said housing and adjustment of said second mechanical thrust bearing relative to said structural unit to compensate for the axial forces generated by said rotor.

2. A pump assembly according to claim 1, wherein said pump is mounted with the axis of said rotor extending vertically and wherein one of said first and second axial bearings is a lower thrust bearing and the other of said bearings is an upper thrust bearing.

3. A pump assembly according to claim 2, wherein said control gear means comprise first and second control gear units, with said first control gear unit affecting said adjustable vertical movement of said structural unit and with said second control gear unit affecting adjustment of said second mechanical thrust bearing.

4. A pump assembly as defined in claim 1, having a forepressure part, wherein said control gear means is disposed in said forepressure part of said pump assembly.

5. A pump assembly as defined in claim 1, having a vacuum area, wherein said control gear means is disposed outside said vacuum area.

6. A pump assembly according to claim 1, wherein said magnetic radial bearing means comprise an upper magnetic bearing unit and a lower magnetic bearing unit each composed of a magnetic radial bearing.

7. A pump assembly according to claim 1, further comprising spring means interposed between said structural unit and said housing.

8. A pump assembly as defined in claim 1, comprising an electromagnetic device interposed between said rotor and said stator for exerting brief axial force impulses on said rotor.

9. A pump assembly as defined in claim 8, wherein said electromagnetic device comprises means for exerting positive and negative force impulses alternately in the axial direction on said rotor at predetermined intervals of time.

10. A pump assembly as defined in claim 8, wherein said electromagnetic device comprises a moving coil and a permanent magnet system with a radial magnetic field.

11. A magnetically supported turbomolecular pump assembly, comprising:
- a housing;
- a rotor and a stator arranged in cooperative relationship with each other in said housing;
- magnetic radial bearing means consisting of magnetic radial bearings which are stable in the radial direction and unstable in the axial direction interposed between said rotor and said stator for mounting said rotor;
- holding means for mounting said magnetic radial bearing means on said stator, said holding means and said stator being structured as parts of a single structured unit which is mounted to be movable in the axial direction within said housing;
- mechanical axial bearing means including a first axial bearing which is arranged firmly in said housing and a second axial bearing, said mechanical axial bearing means operating to absorb axial stresses generated by said rotor;
- force measuring means for measuring the stresses developed by said rotor in said mechanical axial bearing means;
- control gear means responsive to said force measuring means for effecting adjustable vertical movement of said structural unit relative to said housing and adjustment of said second mechanical thrust bearing relative to said structural unit to compensate for the axial forces generated by said rotor; and wherein when said rotor exceeds a predetermined reaction force on said mechanical axial bearing means, which occurs due to the unstable axial position of equilibrium of said rotor, said rotor is held in the proximity of the unstable axial position of equilibrium in such a position in which the reaction force of the rotor on the mechanical axial bearing means remains always below a predetermined reaction force.

* * * * *